United States Patent
Ogasawara et al.

(10) Patent No.: US 9,973,287 B2
(45) Date of Patent: May 15, 2018

(54) CLOCK GENERATION CIRCUIT AND WIRELESS RECEIVING DEVICE

(71) Applicant: KABUSHIKI KAISHA TOSHIBA, Tokyo (JP)

(72) Inventors: Yosuke Ogasawara, Kawasaki Kanagawa (JP); Tsuneo Suzuki, Kamakura Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 108 days.

(21) Appl. No.: 15/218,886

(22) Filed: Jul. 25, 2016

(65) Prior Publication Data

US 2017/0075378 A1 Mar. 16, 2017

(30) Foreign Application Priority Data

Sep. 11, 2015 (JP) .................................. 2015-180086

(51) Int. Cl.
*H04B 15/06* (2006.01)
*G06F 1/04* (2006.01)

(52) U.S. Cl.
CPC .............. *H04B 15/06* (2013.01); *G06F 1/04* (2013.01); *H04B 2215/067* (2013.01)

(58) Field of Classification Search
CPC ....................................................... H04B 15/06
See application file for complete search history.

(56) References Cited

U.S. PATENT DOCUMENTS

| 5,442,664 A | 8/1995 | Rust et al. |
| 8,164,376 B2 | 4/2012 | Furichi |
| 9,071,252 B2 | 6/2015 | Sato et al. |
| 9,525,457 B1 * | 12/2016 | Tucker .................... H04B 15/06 |
| 2011/0038397 A1 * | 2/2011 | Fan .......................... H04B 15/06 375/130 |

FOREIGN PATENT DOCUMENTS

JP 2011146763 A 7/2011

* cited by examiner

*Primary Examiner* — Albert Wang
(74) *Attorney, Agent, or Firm* — Patterson & Sheridan, LLP (57) ABSTRACT

A clock generation circuit includes a random number generator configured to generate random numbers according to a first probability distribution, a filter configured to output random numbers according to a second probability distribution, based on the random numbers according to the first probability distribution input thereto, and a variable delay circuit configured to modulate a clock signal input thereto by delaying edges of the clock signal by amounts corresponding to values of the random numbers according to the second probability distribution. Probability of a smallest number according to the second probability distribution is smaller than probability of the smallest number according to the first probability distribution, and probability of a largest number according to the second probability distribution is smaller than probability of the largest number according to the first probability distribution.

19 Claims, 9 Drawing Sheets

000## CLOCK GENERATION CIRCUIT AND WIRELESS RECEIVING DEVICE

CROSS-REFERENCE TO RELATED APPLICATION

This application is based upon and claims the benefit of priority from Japanese Patent Application No. 2015-180086, filed Sep. 11, 2015, the entire contents of which are incorporated herein by reference.

FIELD

An embodiment described herein relates generally to a clock generation circuit and a wireless receiving device.

BACKGROUND

In a wireless receiving device which includes an analog circuit and a digital circuit, harmonics of a clock signal used in the digital circuit may enter the analog circuit as unnecessary radiation (spurious components), causing receiving sensitivity of the wireless receiving device to be degraded. For this reason, it is preferable that a clock signal for a digital circuit be appropriately generated.

DETAILED DESCRIPTION

An embodiment provides a clock generation circuit and a wireless receiving device in which a clock signal is appropriately generated for a digital circuit.

In general, according to an embodiment, a clock generation circuit includes a random number generator configured to generate random numbers according to a first probability distribution, a filter configured to output random numbers according to a second probability distribution, based on the random numbers according to the first probability distribution input thereto, and a variable delay circuit configured to modulate a clock signal input thereto by delaying edges of the clock signal by amounts corresponding to values of the random numbers according to the second probability distribution. Probability of a smallest number according to the second probability distribution is smaller than probability of the smallest number according to the first probability distribution, and probability of a largest number according to the second probability distribution is smaller than probability of the largest number according to the first probability distribution.

Hereinafter, a clock generation circuit according to the embodiment is described with reference to the drawings. The disclosure is not limited to the embodiment.

A clock generation circuit 1 according to the embodiment is applied to, for example, a wireless receiving device. The wireless receiving device according to wireless standards such as, M-WiMAX, or WLAN and LTE requires high receiving sensitivity in order to secure a wide communication area. In the wireless receiving device, signal processing of a reception signal received in an antenna is performed in an analog manner by an analog circuit, and signal processing of the signal in which signal processing is performed in an analog manner is performed in a digital manner by a digital circuit. In addition, miniaturization of the wireless receiving device is required, and requirements for one chip LSI of the wireless receiving device in which an analog circuit and a digital circuit are included increase. In the one chip LSI, spurious components, such as integer harmonics, of a clock signal, which are generated by the digital circuit, leak into an analog circuit, thereby decreasing reception characteristics. For this reason, countermeasures for preventing spurious components from being generated in an analog circuit are needed.

For example, in the wireless receiving device, a digital circuit performs processing of a signal in a digital manner in synchronization with a clock signal generated by the clock generation circuit 1. At this time, if the clock generation circuit 1 performs modulation by which edge timing of a clock signal to be generated is randomly changed by delaying an input clock signal using random numbers, spurious components can be diffused over the power spectrum.

However, spurious components can remain at a predetermined frequency having not been sufficiently diffused. For example, if a phase difference corresponding to the amount of shift of edge timing of a clock pulse of a reference clock signal is randomly changed in a range of 0° to 360° with respect to one period of a spurious frequency, amplitude of a maximum phase difference (360°) amplitude of a minimum phase difference (0°) in the range overlap each other, when viewed from a phase difference and an amplitude plane (complex plane), and thus the spurious components are not efficiently diffused electrically. For this reason, the spurious components easily remain at a frequency corresponding to a maximum phase difference.

Hence, in the embodiment, remaining spurious components are reduced by changing a probability distribution of random numbers which are used for modulation in which edge timing is changed by the clock generation circuit 1 such that probabilities of a minimum value and a maximum value are reduced more than probability of a median value.

Figure 1:
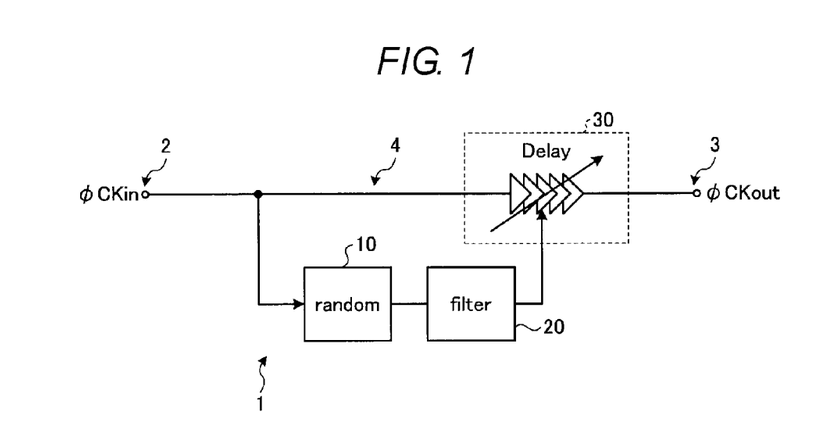
FIG. 1 illustrates a configuration of a clock generation circuit according to an embodiment.

Specifically, as illustrated in FIG. 1, the clock generation circuit 1 receives an input clock signal φCKin through an input terminal 2, and generates an output clock signal (modulated clock signal) φCKout by providing the amount of delay change in accordance with random numbers to the input clock signal φCKin. At this time, the random numbers have a probability distribution which is changed such that probabilities of a minimum value and a maximum value are reduced more than probability of a median value. The clock generation circuit 1 outputs the generated output clock signal φCKout from an output terminal 3. FIG. 1 is a diagram illustrating a configuration of the clock generation circuit 1.

The clock generation circuit 1 includes a random number generation unit 10, a filter 20, and a variable delay unit 30. The random number generation unit 10 and the filter 20 are connected in parallel with a signal line 4 which connects the input terminal 2 to the variable delay unit 30, between the input terminal 2 and the variable delay unit 30.

The variable delay unit 30 receives random numbers from the filter 20 and receives the input clock signal φCKin through the signal line 4 from the input terminal 2. The variable delay unit 30 generates the output clock signal φCKout by providing an amount of delay corresponding to random numbers to the input clock signal φCKin.

Figure 2A:
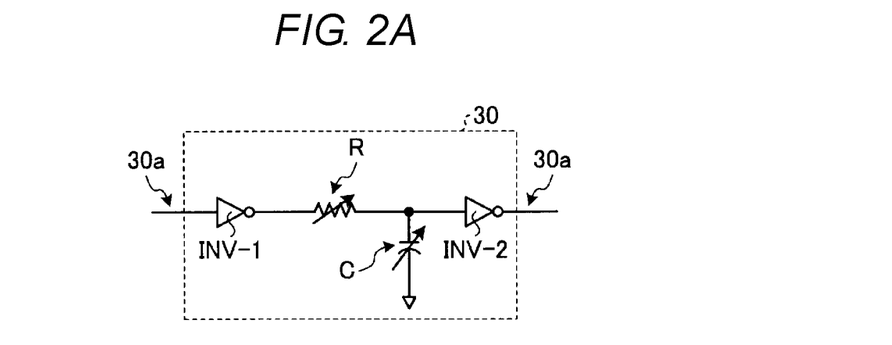
FIGS. 2A to 2D illustrate configurations of variable delay units in the clock generation circuit according to the embodiment.

For example, as illustrated in FIG. 2A, the variable delay unit 30 has a configuration in which the amount of delay is varied by a variable RC circuit in accordance with random numbers. FIG. 2A is a circuit diagram illustrating a configuration of the variable delay unit 30. The variable delay unit 30 illustrated in FIG. 2A includes inverters INV-1 and INV-2, a variable resistor element R, and a variable capacitor element C. The inverter INV-1 includes an input side connected to one terminal 30a of the variable delay unit 30, and an output side connected to one terminal of the variable resistor element R. The variable resistor element R includes the other terminal connected to both one terminal of the variable capacitor element C and an input side of the inverter INV-2. The variable capacitor element C includes the other terminal connected to a ground potential. The inverter INV-2 includes an output terminal connected to the other terminal 30b of the variable delay unit 30. The variable resistor element R changes a resistance value thereof into a resistance value corresponding to random numbers which are supplied. The variable capacitor element C changes a capacitance value thereof into a capacitance value corresponding to random numbers which are supplied. As a result, a time constant of the variable delay unit 30 is changed in accordance with random numbers, and thus the variable delay unit 30 changes the amount of delay thereof into the amount of delay corresponding to random numbers which are supplied.

Figure 2B:
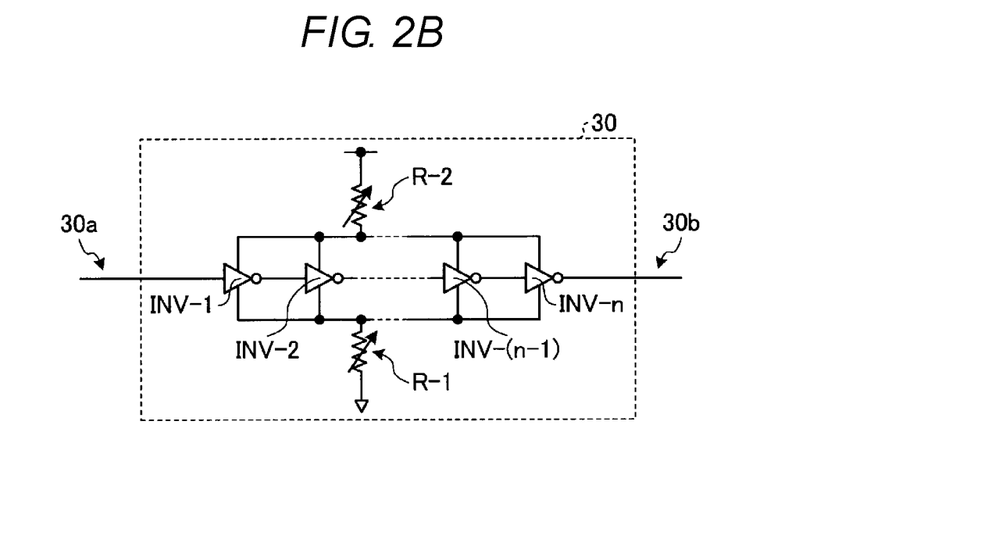

Alternatively, as illustrated in FIG. 2B, the variable delay unit 30 has a configuration in which the amount of delay is changed by variable resistors on a power supply side and a ground side of inverters at n stages (n is even numbers greater than 2). FIG. 2B is a circuit diagram illustrating a configuration of the variable delay unit 30. The variable delay unit 30 illustrated in FIG. 2B includes n inverters INV-1 to INV-n, a variable resistor element R-2 on the power supply side, and a variable resistor element R-1 on the ground side.

An inverter INV-1 at a first stage includes an input side connected to the one terminal 30a of the variable delay unit 30, and an output side connected to an input side of an inverter INV-2 at the second stage. The inverter INV-2 at a second stage includes an output side connected to an input side of an inverter INV-3 at a third stage. An inverter INV-(n−1) at an (n−1)th stage includes an output side connected to an input side of an inverter INV-n at an nth stage. The inverter INV-n at the nth stage includes an output side connected to the other terminal 30b of the variable delay unit 30. The variable resistor element R-2 includes one terminal connected to a terminal on a power supply side of the n inverters INV-1 to INV-n, and the other terminal connected to a power supply potential. The variable resistor element R-1 includes one terminal connected to a terminal on a ground side of the n inverters INV-1 to INV-n, and the other terminal connected to a ground potential. The variable resistor element R-2 changes a resistance value thereof into a resistance value corresponding to random numbers which are supplied. The variable resistor element R-1 changes a resistance value thereof into a resistance value corresponding to random numbers which are supplied. As a result, a response speed on the power supply side and the ground side of the n inverters INV-1 to INV-n is changed in accordance with random numbers, and thus the variable delay unit 30 changes the amount of delay thereof into the amount of delay corresponding to random numbers which are supplied.

Figure 2C:
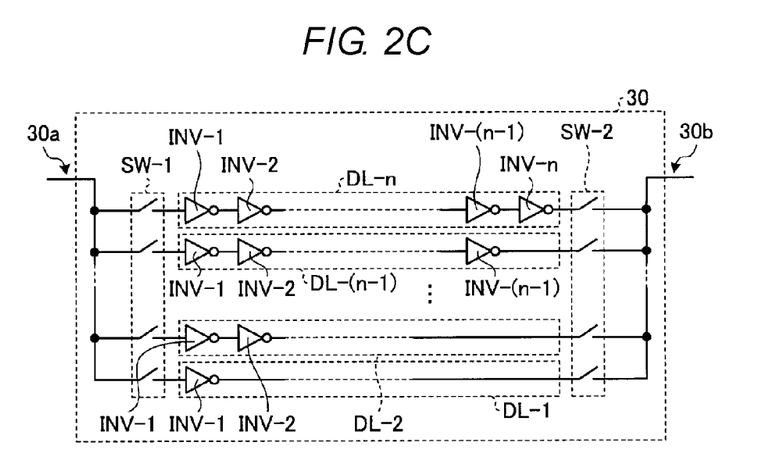

Alternatively, as illustrated in FIG. 2C, the variable delay unit 30 has a configuration in which the amount of delay is varied by switching a delay line that is selected from multiple delay lines. FIG. 2C is a circuit diagram illustrating a configuration of the variable delay unit 30. The variable delay unit 30 illustrated in FIG. 2C includes multiple delay lines DL-1 to DL-n and switching circuits SW-1 and SW-2. The multiple delay lines DL-1 to DL-n respectively include inverters INV in which stages thereof are different from each other, and can provide the amounts of delay different from each other. The delay lines DL-1 includes the inverter INV-1 at one stage, and can provide the amount of delay of the amount at one stage. The delay lines DL-n includes inverters INV-1 to INV-n at n stages, and can provide the amount of delay of the amount at n stages. The switching circuit SW-1 includes multiple switches which are switched on exclusively, and switches a delay line which is connected to the one terminal 30a among the multiple delay lines DL-1 to DL-n in accordance with a switch that is switched on among the multiple switches. The switching circuit SW-2 includes multiple switches which are switched on exclusively, and switches a delay line which is connected to the other terminal 30b among the multiple delay lines DL-1 to DL-n in accordance with a switch that is switched on among the multiple switches. The switching circuit SW-1 changes a switch which is switched on into a switch corresponding to the random numbers which are supplied. The switching circuit SW-2 changes a switch which is switched on into a switch corresponding to the random numbers which are supplied. As a result, a delay line which is selected from the multiple delay lines DL-1 to DL-n is changed in accordance with random numbers, the variable delay unit 30 changes the amount of delay thereof into the amount of delay corresponding to the random numbers which are supplied.

Figure 2D:
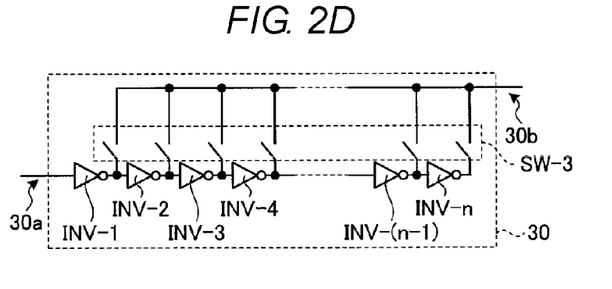

Alternatively, as illustrated in FIG. 2D, the variable delay unit 30 has a configuration in which the amount of delay is varied by varying the number of stages of inverters in a chain. FIG. 2D is a circuit diagram illustrating a configuration of the variable delay unit 30. The variable delay unit 30 illustrated in FIG. 2D includes n inverters INV-1 to INV-n, and a switching circuit SW-3. The switching circuit SW-3 includes multiple switches which are switched on exclusively, and switches the number of stages of inverters for passing through between the one terminal 30a and the other terminal 30b in accordance with a switch which is switched on among the multiple switches. The switching circuit SW-3 changes a switch which is switched on into a switch corresponding to the random numbers which are supplied. As a result, the number of stages of inverters between the one terminal 30a and the other terminal 30b is varied in accordance with a time constant, and thus the variable delay unit 30 changes the amount of delay thereof into the amount of delay corresponding to the random numbers which are supplied.

Figure 5:
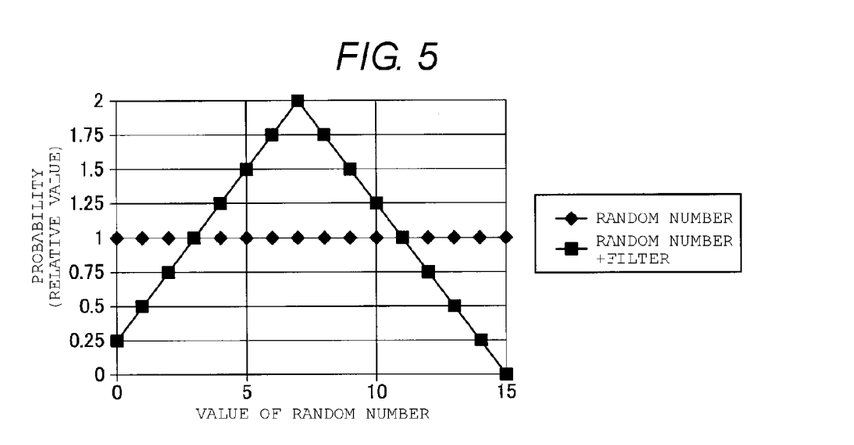
FIG. 5 illustrates a probability distribution of random numbers by the random number generation unit.

Returning to FIG. 1, the random number generation unit 10 generates random numbers having a first probability distribution. In the first probability distribution, each value of the random numbers which is generated has approximately equivalent probability. For example, as illustrated in FIG. 5, if random numbers of 0 to 15 are generated, the random number generation unit 10 generates the random numbers of 0 to 15 in approximately equal probability. FIG. 5 is a diagram illustrating a probability distribution of random numbers, a vertical axis denotes values of relative probability if occurrence probability in the random number generation unit 10 is set to 1, and a horizontal axis denotes values of random numbers.

Figure 3:
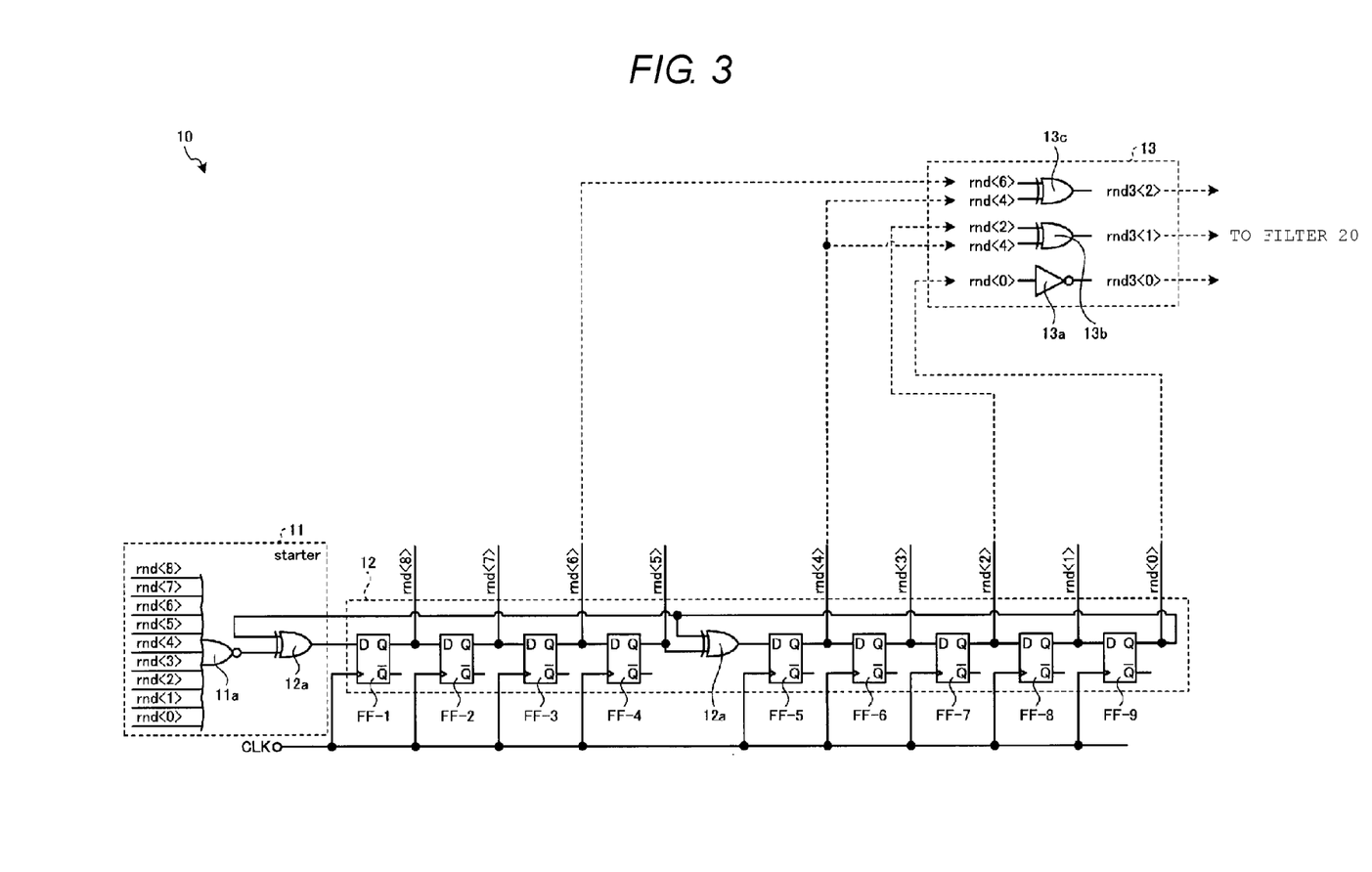
FIG. 3 illustrates a configuration of a random number generation unit in the clock generation circuit according to the embodiment.

For example, the random number generation unit 10 can generate a random number of three bits rnd3<2:0>, using the configuration illustrated in FIG. 3. FIG. 3 is a diagram illustrating a configuration of the random number generation unit 10. The random number generation unit 10 includes a starter 11, a shift register 12, and a logic circuit 13. The starter 11 is provided to prevent the random number from being fixed at zero. The starter 11 includes a NOR gate 11a and an OR gate 12a. The NOR gate 11a calculates a negative logical sum of the random number rnd<0> to rnd<8>. The OR gate 12a calculates a logical sum of an output (ransom number rnd<0>) of a final stage of the shift register 12 and an output of the NOR gate 11a.

The shift register 12 includes nine stages of flip-flops FF-1 to FF-9 and the OR gate 12a. The OR gate 12a calculates a logical sum of an output (random number rnd<5>) of the flip-flop FF-4 of a fourth stage and an output (random number rnd<0>) of the flip-flop FF-9 of a final stage, and inputs the calculated value to the flip-flop FF-5 at a fifth stage. The shift register 12 shifts bit values which are output from the OR gate 12a in synchronization with a clock signal CLK. Accordingly, the random numbers rnd which are output from the flip-flops FF-1 to FF-9 at each stage are changed.

The logic circuit 13 receives random numbers rnd<6>, rnd<4>, rnd<2>, and rnd<0> which are output from the flip-flops at the third, fifth, seventh, and ninth stages FF-3, FF-5, FF-7, and FF-9. The logic circuit 13 includes an inverter 13a and OR gates 13b and 13c. The inverter 13a generates a random number rnd3<0> by logically inverting the random number rnd<0>. The OR gate 13b generates a random number rnd3<1> by calculating a logical sum of the random number rnd<2> and the random number rnd<4>. The OR gate 13c generates a random number rnd3<2> by calculating a logical sum of the random number rnd<4> and the random number rnd<6>. The logic circuit 13 outputs the random number rnd3<2:0> of three bits which are generated to the filter 20.

Returning to FIG. 1, the filter 20 receives random numbers from the random number generation unit 10. The random numbers have first probability distribution. In the first probability distribution, each value of the random numbers which are generated has approximately equal probability. The filter 20 changes the probability distribution of the random numbers from the first probability distribution to a second probability distribution. Probability of a minimum value of the random numbers in the second probability distribution is less than probability of a minimum value of the random numbers in the first probability distribution. Probability of a maximum value of the random numbers in the second probability distribution is less than probability of a maximum value of the random numbers in the first probability distribution. Probability of a median value of the random numbers in the second probability distribution is more than probability of a median value of the random numbers in the first probability distribution.

For example, as illustrated in FIG. 5, if probability of the random numbers (random numbers of three bits) of 0 to 15 which are generated by the random number generation unit 10 is set as 1, the filter 20 sets the random numbers of 0 to 2, and 12 to 15 as probability less than 1, and sets the random numbers of 4 to 10 as probability greater than 1. The filter 20 sets probability of a minimum value 0 of the random numbers and probability of a minimum value 15 of the random numbers, as an extremely small value, and sets probability of a median value 7 of the random numbers as an extremely large value 2. The filter 20 changes a probability distribution (first probability distribution) of the random numbers into a probability distribution (second probability distribution) of a mountain type. Here, assuming that a maximum delay of the clock signal is 360°, the minimum value 0 corresponds to no delay of the clock signal, and the maximum value 15 corresponds to 360° delay of the clock signal. The other values 1 to 14 corresponds to delay of the clock signal that is greater than 0° and smaller than 360°. Typically, the delay amount is proportionate to the value.

Figure 4:
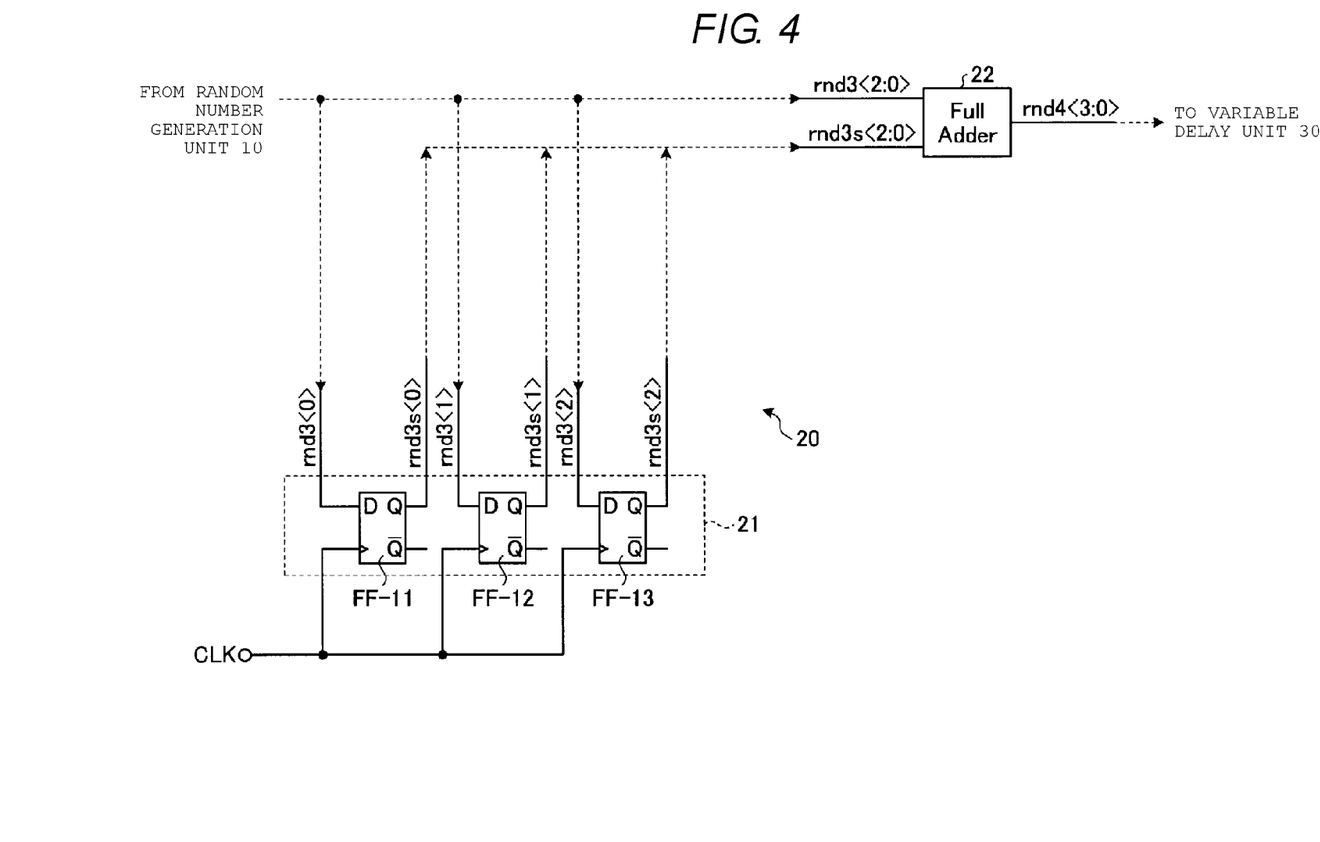
FIG. 4 illustrates a configuration of a filter in the clock generation circuit according to the embodiment.

For example, as illustrated in FIG. 4, the filter 20 can generate the random numbers rnd4<3:0> of four bits by a configuration in which the current random number (three bits) is added to a random number (three bits) before one clock pulse. The filter 20 includes a delay unit 21 and a full addition unit 22. The delay unit 21 includes multiple flip-flops FF-11 to FF-13. The multiple flip-flops FF-11 generate the random number rnd3s<0> by delaying the random number rnd3<0> received from the random number generation unit 10 by the amount of one clock pulse, and output the random number rnd3s<0> to the full addition unit 22. The multiple flip-flops FF-12 generate the random number rnd3s<1> by delaying the random number rnd3<1> received from the random number generation unit 10 by the amount of one clock pulse, and output the random number rnd3s<1> to the full addition unit 22. The multiple flip-flops FF-13 generate the random number rnd3s<2> by delaying the random number rnd3<2> received from the random number generation unit 10 by the amount of one clock pulse, and output the random number rnd3s<2> to the full addition unit 22.

The full addition unit 22 adds the random number rnd3<2:0> of three bits received from the random number generation unit 10 to the random number rnd3s<2:0> of three bits received from the delay unit 21, and outputs the addition results to the variable delay unit 30 as the random number rnd4<3:0> of four bits.

Figure 6:
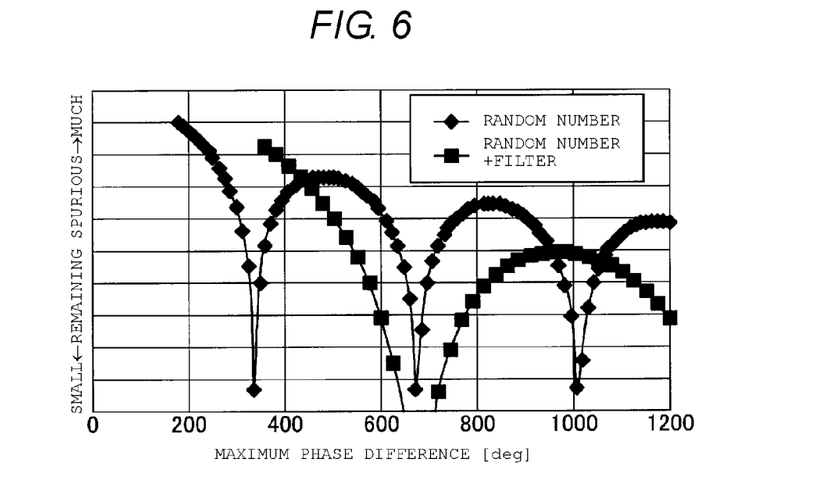
FIG. 6 illustrates levels of spurious when the random number generation unit operates and when random number generation unit and the filter operate.

For example, if the probability distribution (first probability distribution) referred to as "random number" illustrated in FIG. 5 is changed into a probability distribution (second probability distribution) referred to as "random number+filter", and the variable delay unit 30 is operated by the random number having the second probability distribution, remaining spurious components can be reduced, as illustrated in FIG. 6. FIG. 6 is a diagram illustrating a result of an operation of the clock generation circuit 1.

That is, if a horizontal axis denotes a maximum value (maximum phase difference) of a range in which a phase difference corresponding to the amount of shift of edge timing of a clock signal is varied in order to diffuse the spurious on a frequency spectrum in a power manner, and a vertical axis denotes the amount of remaining spurious components (power level), the characteristics illustrated in FIG. 6 are obtained. A phase difference corresponding to the amount of shift of edge timing of a clock signal is represented by a unit of a phase (phase angle) with respect to one period of a spurious frequency. If characteristics referred to as "random number" are compared with characteristics referred to as "random number+filter", it is possible to confirm that the remaining spurious is reduced near, for example, 720°. That is, it can be seen that the effect of overlapping of amplitude of a maximum phase difference (720°) and amplitude of a minimum phase difference (0°) can be effectively reduced by an action of the filter 20, if a phase difference between rising edge timing and falling edge timing of a clock pulse is randomly changed in a range of 0° to 720°.

Figure 7:
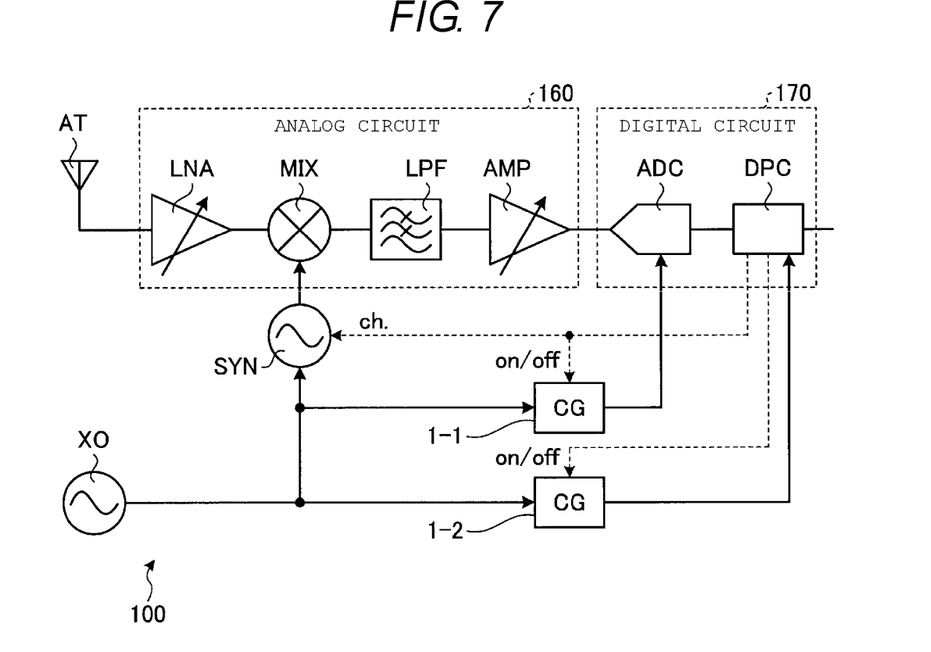
FIG. 7 illustrates a configuration of a wireless receiving device including the clock generation circuit according to the embodiment.

Subsequently, a wireless receiving device 100 to which the clock generation circuit 1 is applied is described with reference to FIG. 7. FIG. 7 is a diagram illustrating a configuration of the wireless receiving device 100.

The wireless receiving device 100 includes an antenna AT, an analog circuit 160, a digital circuit 170, an original oscillator XO, a local oscillation circuit SYN, and clock generation circuits 1-1 and 1-2. The analog circuit 160 includes a low noise antenna LNA, a mixer MIX, a low pass filter LPF and a variable amplifier AMP. The digital circuit 170 includes an AD converter ADC and a digital processing circuit DPC. In the wireless receiving device 100, the clock generation circuits 1-1 and 1-2 are respectively provided with respect to the AD converter ADC and the digital processing circuit DPC, and are configured such that operations of modulating the clock signal can be on/off separately from each other.

Figure 8A:
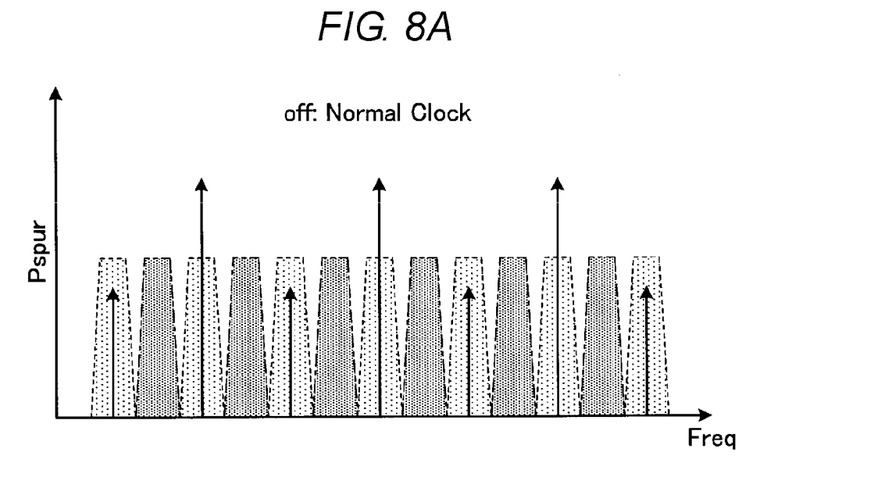
FIGS. 8A and 8B illustrate levels of wireless signals and the spurious when a clock modulation operation is not performed and performed, respectively.
Figure 8B:
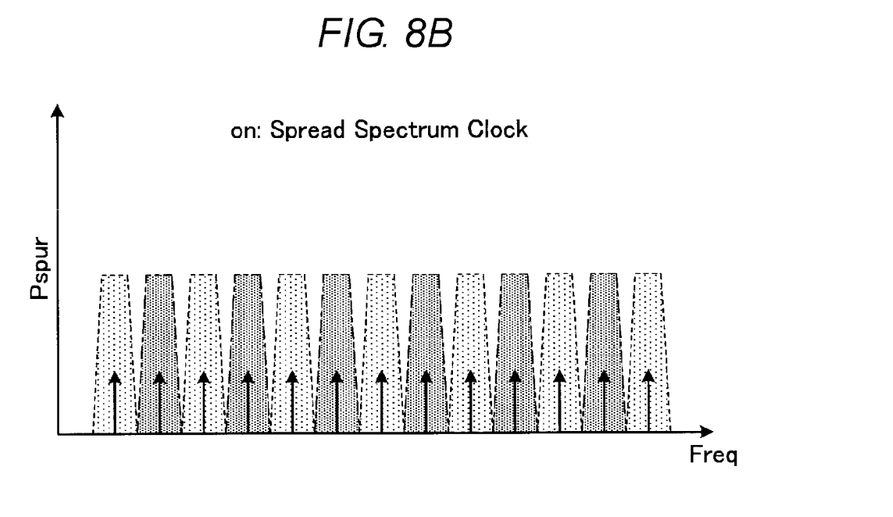

In the wireless receiving device 100, if clock modulation operations of the clock generation circuits 1-1 and 1-2 are in the off state, spurious components denoted by arrows of FIG. 8A can be generated. In contrast, if clock modulation operations are in the on state, spurious components denoted by arrows of FIG. 8B can be generated. FIGS. 8A and 8B are respectively diagram illustrating an operation of the wireless receiving device 100, a vertical axis denotes power, and a horizontal axis denotes a frequency. When the clock modulation operation is on (FIG. 8B), extraneous spurious components are newly generated at a frequency which is not generated when the clock modulation operation is in the state of off (FIG. 8A). For this reason, a function of making the clock modulation operations of the clock generation circuits 1-1 and 1-2 on/off is effective according to the frequency bands to be used.

For example, if a receiving channel is a signal denoted by a one-dotted chain line of FIG. 8A, a frequency with the spurious components denoted by arrows does not overlap a frequency of a desired signal. For this reason, the digital processing circuit DPC controls the clock generation circuits 1-1 and 1-2 such that the clock modulations performed by the clock generation circuits 1-1 and 1-2 are in the off state. The clock generation circuits 1-1 and 1-2 continuously output the reference clock signal (output clock signal φCKout which provides a constant amount of delay to the input clock signal φCKin). In addition, if a receiving channel is a signal denoted by a dashed line of FIG. 8B, the frequency with the spurious components denoted by the arrows overlaps a frequency of a desired signal. For this reason, the digital processing circuit DPC controls the clock generation circuits 1-1 and 1-2 such that the clock modulations performed by the clock generation circuits 1-1 and 1-2 are in the on state. The clock generation circuits 1-1 and 1-2 output clock signals obtained by modulating edge timing by the amount of delay corresponding to the random numbers with respect to the input clock signal. In FIGS. 8A and 8B, vertical axes denote a power level, and horizontal axes denote a frequency, respectively.

Alternatively, for example, if a signal level is high and the effect of spurious components on a receiving signal decreases, necessity for modulating the clock signal decreases. For this reason, the digital processing circuit DPC controls the clock generation circuits 1-1 and 1-2 such that the clock modulations performed by the clock generation circuits 1-1 and 1-2 are off. The clock generation circuits 1-1 and 1-2 continuously output the reference clock signal. In addition, if a signal level is low and the effect of spurious components on a receiving signal increases, necessity for modulating the clock signal increases. For this reason, the digital processing circuit DPC controls the clock generation circuits 1-1 and 1-2 such that the clock modulations performed by the clock generation circuits 1-1 and 1-2 are in the on state. The clock generation circuits 1-1 and 1-2 output clock signals obtained by modulating the reference clock signal by the amount of delay corresponding to the random numbers.

As described above, in the embodiment, the probability distribution of the random numbers which are used for modulation in which edge timing is changed by the clock generation circuit 1 is changed such that the probabilities of the minimum value and the maximum value are less than probability of a median value. Hence, the output clock signal (modulated clock signal) is generated by providing the amount of delay which is changed in accordance with random numbers having the probability distribution to the input clock signal. As a result, the clock generation circuit 1 can reduce the remaining value of the spurious components.

Figure 9:
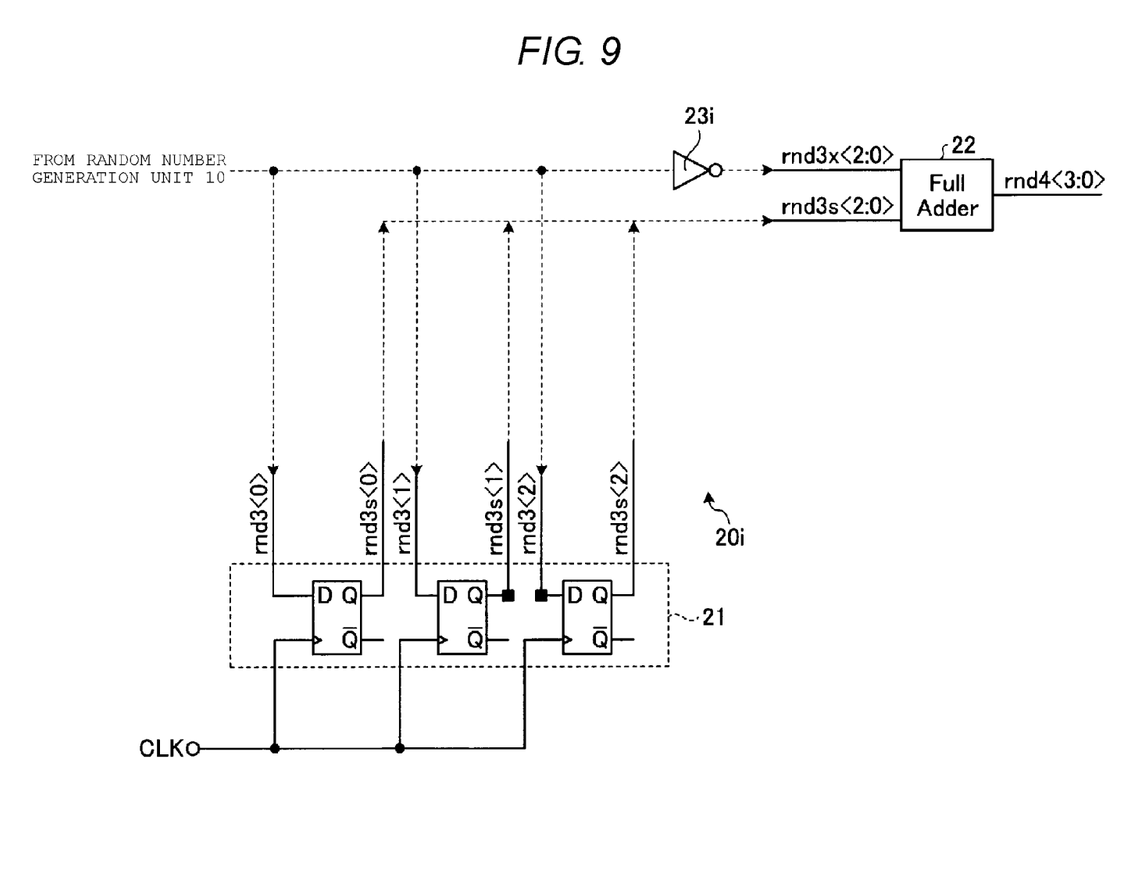
FIG. 9 illustrates a configuration of a filter according to a modification example.

As illustrated in FIG. 9, a filter 20i may generate the random number rnd4<3:0> of four bits, using a configuration in which a random number (three bits) before one clock pulse is subtracted from a current random number (three bits). That is, the filter 20i further includes an inversion circuit 23i in the configuration illustrated in FIG. 4. The inversion circuit 23i generates a random number rnd3x<2:0> which is obtained by logically inverting a random number rnd3<2:0> received from the random number generation unit 10, and outputs the random number to the full addition unit 22. The full addition unit 22 adds the random number rnd3s<0> to the random number rnd3x<2:0>, and equivalently, subtracts the random number rnd3x<2:0> from the random number rnd3s<0>. As a result, in the same manner as in the embodiment, it is possible to change probability distribution of random numbers into the second probability distribution from the first probability distribution. In addition, since frequency components can be reduced, compared to the configuration illustrated in FIG. 4, the spurious is easily diffused on a frequency spectrum in a power manner.

While certain embodiments have been described, these embodiments have been presented byway of an example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A clock generation circuit, comprising:
    a random number generator configured to generate random numbers according to a first probability distribution;
    a filter configured to output random numbers according to a second probability distribution, based on the random numbers according to the first probability distribution input thereto; and
    a variable delay circuit configured to modulate a clock signal input thereto by delaying edges of the clock signal by amounts corresponding to values of the random numbers according to the second probability distribution, wherein
    probability of a smallest number according to the second probability distribution is smaller than probability of the smallest number according to the first probability distribution, and probability of a largest number according to the second probability distribution is smaller than probability of the largest number according to the first probability distribution.

2. The clock generation circuit according to claim 1, wherein
    probability of a median number according to the second probability distribution is greater than probability of the median number according to the first probability distribution.

3. The clock generation circuit according to claim 1, wherein
    the first probability distribution is an uniform probability distribution.

4. The clock generation circuit according to claim 1, wherein
    a phase of the clock signal delayed by an amount corresponding to the smallest number is equal to a phase of the clock signal delayed by an amount corresponding to the largest number.

5. The clock generation circuit according to claim 1, wherein the variable delay circuit includes:
    a first inverter to which the clock signal is input;
    an RC circuit connected to the first inverter and having a variable register of which resistance is set to values corresponding to the random numbers according to the second probability distribution, and a variable capacitor of which resistance is set to values corresponding to the random numbers according to the second probability distribution; and
    a second inverter connected to the RC circuit and output a clock signal modulated by the RC circuit.

6. The clock generation circuit according to claim 1, wherein the variable delay circuit includes:
    a chain of inverters including a first inverter and a last inverter, the first inverter receiving the clock signal, the last inverter providing the modulated clock signal, each inverter having a positive power input and a negative power input;
    a first variable resistor connected between a first potential and the positive power inputs of the inverters, resistance thereof being set to values corresponding to the random numbers according to the second probability distribution; and
    a second variable resistor connected between a second potential and the negative power inputs of the inverters, resistance thereof being set to values corresponding to the random numbers according to the second probability distribution.

7. The clock generation circuit according to claim 1, wherein the variable delay circuit includes:
    a first chain of inverters;
    a second chain of inverters, the second chain having a greater number of inverters than the first chain;
    a first switch configured to connect the input clock signal to one of the first chain or the second chain, based on the number output from the filter.

8. The clock generation circuit according to claim 1, wherein the variable delay circuit includes:
    a plurality of inverters arranged in a chain and having a first inverter that receives the input clock signal; and
    a selection switch configured to connect an output of one of the inverters to an output terminal od the variable delay circuit.

9. The clock generation circuit according to claim 1, wherein the random number generator includes:
    a starter circuit that receives one of a plurality of starting numbers;
    a shift register that includes a plurality of flip-flop stages which generate a number based on said one of the starting numbers; and
    a logic circuit that receives the generated number from the shift register, and provide the random numbers having the first probability distribution.

10. The clock generation circuit according to claim 1, wherein the filter includes:
    a delay circuit configured to generate a delayed random number based on each of the random numbers having the first probability distribution; and
    a full adder configured to add the delayed random number and a corresponding one of the random numbers having the first probability distribution, and provide the random numbers having the second probability distribution.

11. The clock generation circuit according to claim 1, wherein the filter includes:
    a delay circuit configured to generate a delayed random number based on each of the random numbers having the first probability distribution;
    an inverter configured to invert each of the random numbers having the first probability distribution; and
    a full adder configured to add the delayed random number and a corresponding one of the inverted random numbers having the first probability distribution, and provide the random numbers having the second probability distribution.

12. A wireless communication device, comprising:
    an antenna;
    an analog circuit configured to process an analog signal output from the antenna;
    a digital circuit configured to process an analog signal output from the analog circuit; and
    a clock generation circuit configured to supply a clock signal to the digital circuit, the clock generation circuit including:
    a random number generator configured to generate random numbers according to a first probability distribution;
    a filter configured to output random numbers according to a second probability distribution, based on the random numbers according to the first probability distribution input thereto; and
    a variable delay circuit configured to modulate a clock signal input thereto by delaying edges of the clock signal by amounts corresponding to values of the random numbers according to the second probability distribution and output the modulated clock signal to the digital circuit, wherein probability of a smallest number according to the second probability distribution is smaller than probability of the smallest number according to the first probability distribution, and probability of a largest number according to the second probability distribution is smaller than probability of the largest number according to the first probability distribution.

13. The wireless communication device according to claim 12, wherein probability of a median number according to the second probability distribution is greater than probability of the median number according to the first probability distribution.

14. The wireless communication device according to claim 12, wherein the first probability distribution is an uniform probability distribution.

15. The wireless communication device according to claim 12, wherein a phase of the clock signal delayed by an amount corresponding to the smallest number is equal to a phase of the clock signal delayed by an amount corresponding to the largest number.

16. A method for modulating a clock signal, comprising:

generating random numbers having a first probability distribution;

generating random numbers having a second probability distribution, based on the random numbers having the first probability distribution; and delaying edges of a clock signal by amounts corresponding to values of the random numbers according to the second probability distribution, wherein probability of a smallest number according to the second probability distribution is smaller than probability of the smallest number according to the first probability distribution, and probability of a largest number according to the second probability distribution is smaller than probability of the largest number according to the first probability distribution.

17. The method according to claim 16, wherein probability of a median number according to the second probability distribution is greater than probability of the median number according to the first probability distribution.

18. The method according to claim 16, wherein the first probability distribution is an uniform probability distribution.

19. The method according to claim 16, wherein a phase of the clock signal delayed by an amount corresponding to the smallest number is equal to a phase of the clock signal delayed by an amount corresponding to the largest number.

* * * * *